(12) United States Patent
Astely et al.

(10) Patent No.: US 7,406,336 B2
(45) Date of Patent: Jul. 29, 2008

(54) METHOD FOR DETERMINING TRANSMIT WEIGHTS

(75) Inventors: David Astely, Bromma (SE); Peter Larsson, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 71 days.

(21) Appl. No.: 10/596,688

(22) PCT Filed: Dec. 22, 2003

(86) PCT No.: PCT/SE03/02071

§ 371 (c)(1),
(2), (4) Date: Jun. 21, 2006

(87) PCT Pub. No.: WO2005/062496

PCT Pub. Date: Jul. 7, 2005

(65) Prior Publication Data

US 2007/0099666 A1    May 3, 2007

(51) Int. Cl.
*H04M 1/00* (2006.01)
*H04B 1/02* (2006.01)
(52) U.S. Cl. ..................... 455/562.1; 342/367
(58) Field of Classification Search .............. 455/562.1, 455/69, 101; 342/367, 371–373; 375/299
See application file for complete search history.

(56) References Cited

U.S. PATENT DOCUMENTS

2004/0178954 A1* 9/2004 Vook et al. ................. 342/383

FOREIGN PATENT DOCUMENTS

EP        1265377 A2    12/2002
WO    WO 03077491 A1    9/2003

OTHER PUBLICATIONS

Banister, B.C. et al., "Implementation of Transit Antenna Weight Adaptation Through Stochastic Gradient Feedback",.2001 pp. 1517-1524, vol. 2, Signals, Systems and Computers, 2001 Conference Record of the Thirty-Fifth Asilomare Conference.
Banister, B.C. et al., "A Stochastic Gradient Algorithm for Transmit Antenna Weight Adaptationi with Feedback", 2001, pp. 314-317, Wireless Communications, 2001 IEEE Third Workshop on Signal Processing Advances.
Banister, B.C. et al, "A Simple Gradient Sign Algorithm, for Transmit Antenna Weight Adaption with Feedback", May 2003, pp. 1156-1171, vol. 51, Issue 5, Signal Processing, IEEE Transactions on.
Halle, B., "Algorithms and VLSI Architectures for RLS-Based Time Reference Beamforming in Mobile Communications", 1998 pp. 29-36, International Zurich Seminar, Broadband Communication 1998.
Swedish Patent office, International Search Report for PCT/SE2003/02071, dated Jul. 23, 2004.

* cited by examiner

*Primary Examiner*—Lee Nguyen
(74) *Attorney, Agent, or Firm*—Roger S. Burleigh

(57) ABSTRACT

The present invention relates to beamforming in a multi-carrier multi-user communication system applying an adaptive method for determining transmit weights for the various antenna beams. A set of complex transmission weights is adapted in response to appropriate feedback information on transmission quality from receiving units in order to achieve a maximization of a function of said quality indicator and thus optimize the transmission of the pilot signal.

6 Claims, 3 Drawing Sheets

METHOD FOR DETERMINING TRANSMIT WEIGHTS

FIELD OF THE INVENTION

The present invention relates to a beamforming communication system applying an adaptive method for determining transmit weights for the various antenna beams.

BACKGROUND OF THE INVENTION

Multiple antenna elements can be used to adapt the effective radiation pattern to varying channel and interference conditions. In its simplest form the signal is transmitted from all the antennas with antenna specific complex weights, i.e. a weight that is determined by an amplitude value and a phase. By this means it is possible to achieve a directivity gain when focussing the transmitted energy to the intended receivers instead or merely spreading energy uniformly over the whole coverage area.

There are several techniques commonly used in second and third generation systems: Conventional beamforming assumes a reasonably well-behaved propagation and requires a calibrated antenna array so that a direction of arrival can be determined from the average correlations of the received signals. Based on the direction and knowledge of the array geometry, transmit weights are determined as functions of the direction. In fixed multibeam antenna systems a set of fixed beams with different pointing directions is used and subset of the beams are selected for downlink transmission. Typically, the beam in which the most power is received is used for transmission. This technique has less requirements on calibration compared to conventional beamforming but still requires a reasonably well-behaved propagation environment. Yet another technique is closed loop transmit diversity where the transmitter transmits antenna specific pilots from which the receivers can estimate the channels. The transmitters and the receivers use an agreed set of weights. The receiver determines the weight in the set that best matches the channel and signals this to the transmitter. The weights are in essence adapted to the instantaneous downlink channel.

Another possibility is to transmit antenna specific training signals from which the terminals can estimate the complex valued downlink channel responses. The estimated downlink channels are then fed back to the receiver and used to construct transmit weights, see e.g. Gerlach, Paulraj: "Adaptive Transmitting Antenna Arrays with Feedback", IEEE Signal Processing Letters, Vol 1, No 10, p 150-152, October 1994. Such an approach considers only the channel, and a practical implementation will require some form of quantization and agreed code book in order to fed back complex valued channel responses.

A simpler approach is considered in Banister, Zeidler: "A Simple Gradient Sign Algorithm for Transmit Antenna Weight Adaptation with Feedback", IEEE Transactions on Signal Processing, volume 51, No. 5, p 1156-1171, May 2003. Here, a single weight vector for a single user is tracked. This is done by creating two weight vectors as slightly randomly perturbed versions of the currently tracked weight vector. Multiplexed pilot signals are then transmitted so that the receiver can measure the received power on the two weight vectors and report back to the transmitter which pilot was received with the highest power. The transmitter will then replace the currently used weight vector with the weight vector corresponding to the strongest received pilot signal. The process is then repeated in a continuous fashion. Thus, only a single user is considered and only a single bit is fed back to the transmitter for each measurement period. A similar method is proposed in Banister, Zeidler, "Feedback Assisted Transmission Subspace Tracking for MIMO Systems", IEEE Journal on Selected Areas in Communications, Vol. 21, No. 3, p 452-463, April 2003. In this case antenna specific pilots are used in addition to the pilots used to transmit data, and only a single feedback is generated.

SUMMARY OF THE INVENTION

It is an object of the present invention to achieve a communication system applying beamforming data transmission that provides improved downlink communication channels between an access point and several mobile terminals. The transmission beams are determined by means of weights that are assigned to the various data streams that are transmitted over the access point antennas. Data streams can either be dedicated and intended to a single user or common, intended to multiple users.

It is the principal idea of the present invention to apply a set of complex transmission weights that is adaptable in response to appropriate feedback information on transmission quality from receiving units. The set of transmission weights is shared by the users served by the access point.

Briefly, the method according to the present invention is performed in an access point sending weighted sets of pilot signals to a plurality of mobile terminals. The mobile terminals perform measurements on a channel quality property, which mobile terminal and access point have agreed upon, and from which a quality indicator of the received pilots can be derived. The mobile terminals retransmit a feedback report including said quality indicators to the access point. The access point adapts the set of transmit weights for the pilot signals in response to the received feedback reports in order to achieve a maximisation of a function of said quality indicator and thus optimise the transmission of the pilot signal. The set of weights could simultaneously comprise beams for transmission to several users as well as to individual users.

The present invention allows an adaptation of downlink communication channels with only a limited involvement of the mobile terminals.

It is another advantage of the present invention that an optimisation of downlink channels can be achieved with regard to all potential influences on the communication channel and, particularly, without need for a calibration of access point and antenna.

It is still another advantage of the present invention that the channel adaptation needs not to be based on propagation assumptions.

Yet another advantage of the present invention is that the pilots used for measurements for adapting the set of transmission weights are shared by all served users. Further, since the set of weights adapted based on feedback from several users, transmit weights to be used for transmission of the same data to several users can be found.

Other objects, advantages and novel features of the invention will become apparent from the following detailed description of the invention when considered in conjunction with the accompanying drawings and claims.

For a better understanding, reference is made to the following drawings and preferred embodiments of the invention.

DETAILED DESCRIPTION

Figure 1:
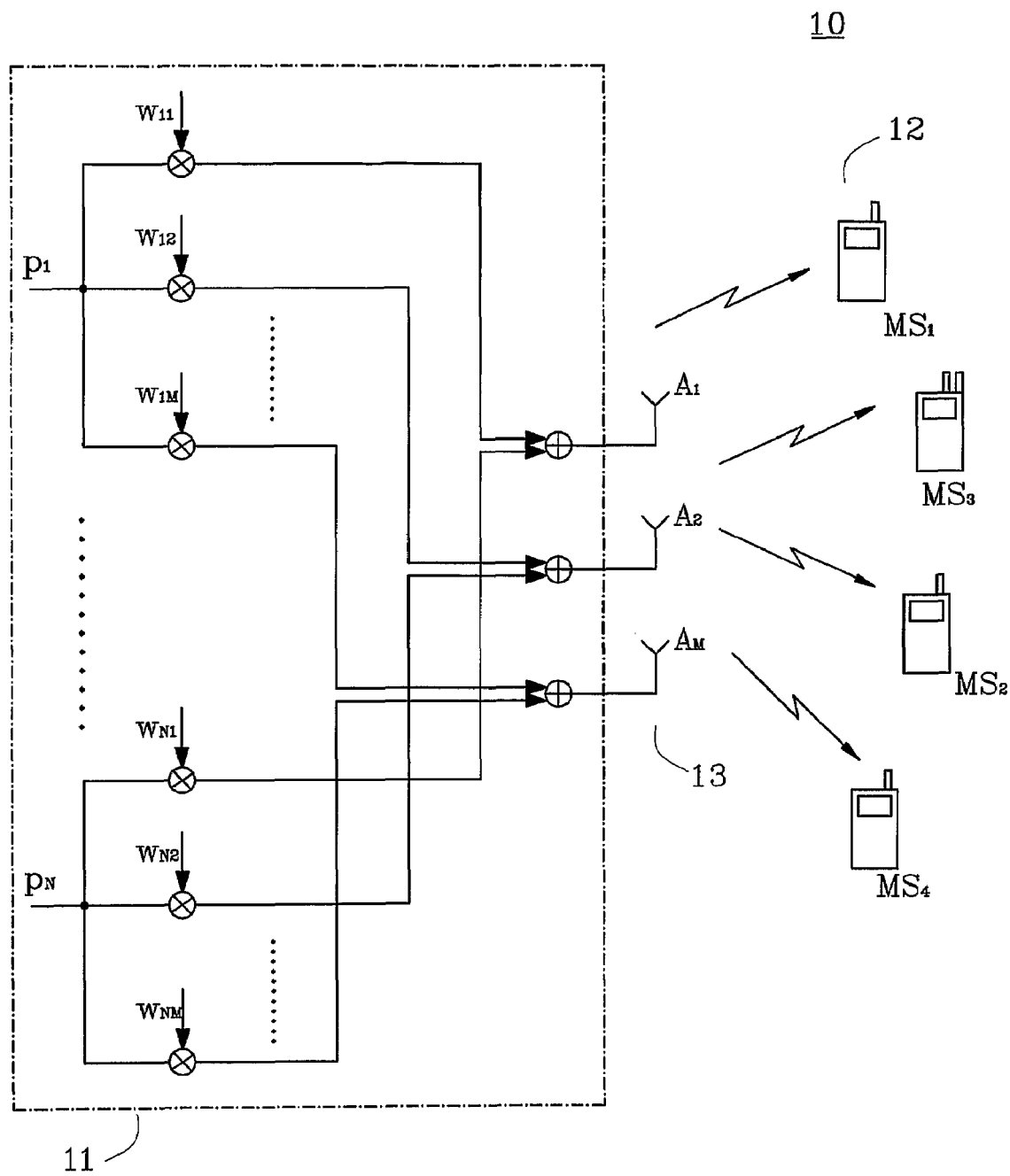
FIG. 1 shows a part of a communication system within which the present invention is applied.

FIG. 1 shows a simplified picture of a part of a communication system 10 within which the present invention can be applied. The radio base station is represented as an access point 11 comprising several antennas $A_1, \ldots, A_M$ for data transmission to a plurality of mobile terminals $MS_1, \ldots, MS_4$, each of which equipped with one or more antennas. The area, which can be served by said access point 11, is referred to as a cell. For the sake of simplicity, the case in which the same transmit weights are applied to all symbols in a pilot sequence is considered. In a multi-carrier system such as OFDM, different parts of a pilot sequence can be transmitted on different carrier frequencies with different transmit weights at the different frequencies. In this context, the weight vector comprises all the weight vectors use at the different frequencies.

Figure 3A:
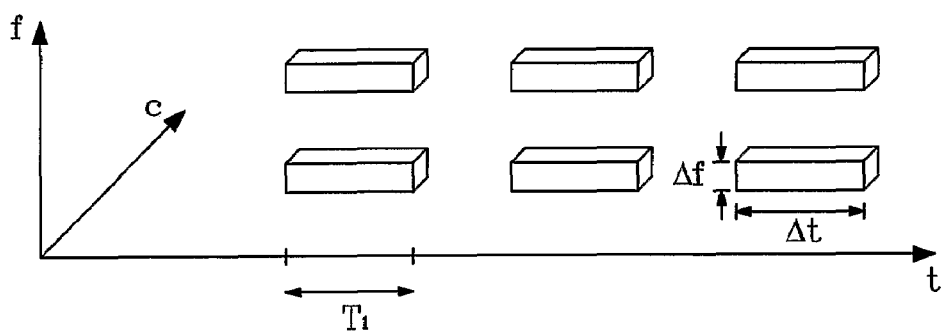
FIGS. 3a and 3b show short and long measurement periods for pilot signals in a time-frequency space.
Figure 3B:
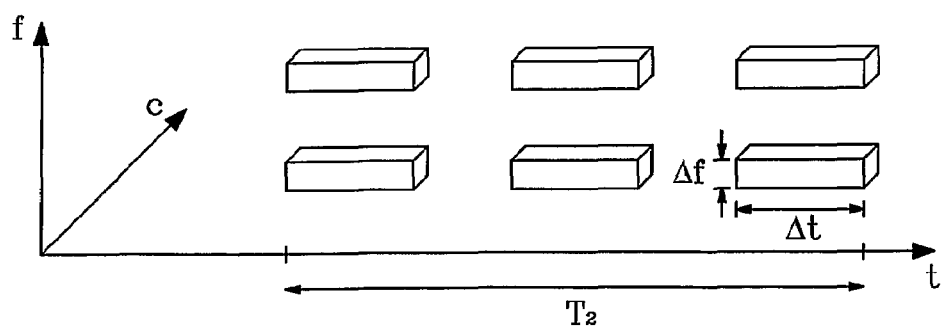

The access point comprises M antennas $A_1, \ldots, A_M$ for transmission of N pilots, which are transmitted with a number of time-, frequency resources, e.g. as shown in FIGS. 3a and 3b. Each pilot sequence $p_n$ (n=1 ... N) is assigned to a set of complex transmission weights $w_n = \{w_{n1}, \ldots, w_{nM}\}$, whereby each of the weights of such a vector describes the transmission behaviour over the antenna $A_m$ and can be described with a non-frequency selective channel with impulse response $w_{nm}(t) = \xi_{nm} e^{j\phi_{nm}} \cdot \delta(t - \tau_{nm})$ comprising at least parameters denoting the amplitude $\xi_{nm}$ and phase shift $\phi_{nm}$ of the antenna transmission, and optionally a parameter $\tau_{nm}$ indicating a certain time delay value for transmitting data over the antenna $A_m$. The set of M complex transmission weights determines, together with the antenna arrangement and hardware, the direction and shape of the antenna beam. As a particular example, $\xi_{nm}$ may assume a unit value, while the phase is given by $e^{j\phi_{nm}}$. The aggregate set of phase values from multiple weights operating over multiple antennas, impacts radiation pattern, and for a so-called uniform linear array if $\phi_i = k \cdot \phi_0$, where k is an integer, the radiation pattern generally has a direction of a beam in relation to a predefined reference axis. Finally, $\delta(t-\tau_i)$ expresses a time delay $\tau_i$ for the transmission of pilot signals relative to a certain fixed point in time. A transmitted pilot signal can thus be regarded to be a known sequence of symbols, which is transmitted with a specific associated weight vector defining a unique beam for each of the transmitted pilot signals, and which can be multiplexed with other transmitted data. In a preferred embodiment, orthogonal pilot sequences are chosen so that the terminals can measure the quality easily.

In the general case in a multicarrier setting using for example OFDM, the $n^{th}$ pilot is a sequence of K symbols $p_n(k), k=1, \ldots, K$. Each symbol is then transmitted at a certain time and at a certain carrier, and associated with each symbol is a specific weight $w_n(k) = \{w_{n1}(k), \ldots, w_{nM}(k)\}$. For example, different weights are used at different frequencies. In the following, as mentioned above in order to ease the notation, it is assumed that the same weights are used for all pilot symbols. The mobile terminals $MS_1, \ldots, MS_i$ receive fractions of the transmitted pilot beams, depending on their position with regard to transmission angel, distance to the access point and radio propagation conditions and perform measurements of certain properties of the downlink channel on which the pilot signals have been received. From said measurements the mobile terminals determine a quality indicator of the received pilot signals that is transmitted back to the mobile terminal as feedback information on the experienced reception quality of each of the pilot signals from each of the mobile terminals.

Figure 2:
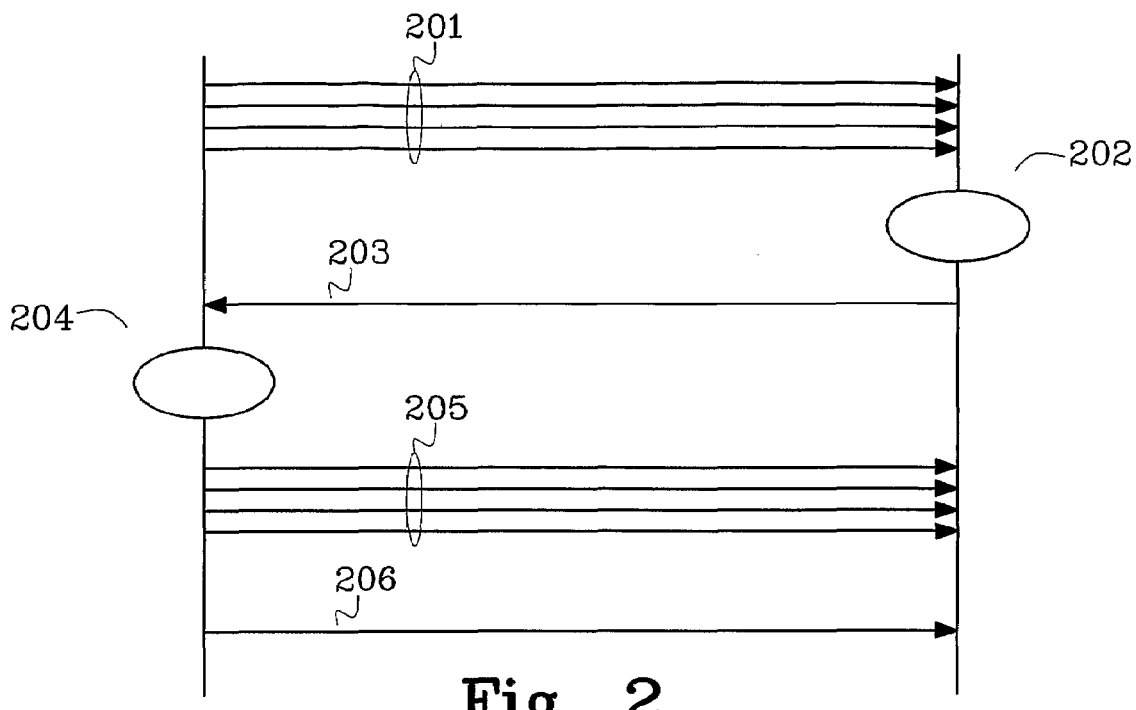
FIG. 2 shows a signalling diagram illustrating the method according to the present invention.

FIG. 2 illustrates a signalling diagram for the method according to the present invention. The access point transmits 201 a set of pilot sequences $p=\{p_1, \ldots, p_N\}$ whereby each of the pilots $p_i$ is assigned to a set of complex weights $w_i = \{w_{i1}, \ldots, w_{iM}\}$. The illustrated example assumes an access point with two antennas, i.e. M=2, and four pilot signals, i.e. N=4. There are several possibilities to define an initial set w of weight vectors for the pilots. It is one conceivable alternative to define an initial set of weight vectors that spreads the pilot beams equally over the entire cell area that is served by the access point. This can be achieved, e.g., by the set of weight vectors defined below:

$$w_1 = \begin{pmatrix} 1 \\ e^{j\pi/4} \end{pmatrix}, w_2 = \begin{pmatrix} 1 \\ e^{j3\pi/4} \end{pmatrix}, w_3 = \begin{pmatrix} 1 \\ e^{-j\pi/4} \end{pmatrix}, w_4 = \begin{pmatrix} 1 \\ e^{-j3\pi/4} \end{pmatrix}$$

In this set, the first antenna transmits always with a weight 1 while the second antenna transmits with a certain phase shifting $e^{j\phi}$, which in this example causes four pilot signals each of which spaced out with $\pi/2$ distance between each other. However, it is notwithstanding possible to define other types of spacings of the pilot signals, e.g. if there is already information available about the position of mobile terminals in the cell so that the weight vectors can be selected in such a way that the pilot beams already focus on a specific area. The access point also instructs the mobile terminals to use a certain measurement period during which the mobile stations measure the received quality of the pilot signals. This will be explained later in connection with FIGS. 3a and 3b.

A mobile terminal within the cell that is covered by the access point will thus receive one or several of the transmitted pilot signals depending on its position in relation to the transmitted pilot beams. It is one basic idea of the present invention that the access point can improve the downlink channel quality by help of feedback information from the mobile terminals in response to the received pilot signals and that said feedback information is applied to adapt the set of weight vectors of the pilot signals. For this purpose mobile terminals perform channel measurements 202 to derive a quality indicator for each or a subset of the pilot signals. Said quality indicator is considered to be a value from which the access point can conclude the downlink transmission quality for the various beams to a specific mobile terminal.

There are numerous alternatives of measurements of channel properties that can be applied as a metric to derive said quality indicator. Examples of such measurements can relate to a ratio, e.g. the signal-to-noise ratio (SNR) or the signal-to-interference ratio (SNIR), or a power level, e.g. the received signal power level or the received interference power level. In addition, instantaneous or average interference plus noise levels may be exploited in combination of above quality indicator metrics. Another alternative of a metric is an effective SNR- or SNIR-value, which can be used, either at the mobile terminal or the access point, to deduce a modulation and coding scheme (and hence maximizing the bit rate). The access point instructs 206, at appropriate instances in time, the mobile terminals about the specific channel property or the properties that the mobile terminal shall use to derive the quality indicator and instructs about a certain measurement period during which the indicated channel property shall be measured. The access point schedules measurements and pilot transmissions depending on the expected rate of change of the radio channel, required accuracy, and amount of data to be transmitted and measurement capability of the terminals. The measured channel property itself can be regarded as an adaptive quantity, which can be changed with regard to changes, e.g., of the propagation conditions between access point and mobile terminals.

FIGS. 3a and 3b show two examples of measurement periods during which the mobile stations measure the received quality of the pilot signals. The illustrated pilot signals are transmitted with a number of time- and frequency resources. FIG. 3a relates to a scenario with two antennas with uncorrelated fading and a set of four initial transmit weights as defined above. In order to track variations of the instantaneous channels and to be able to adapt said channels the terminals use short measurement periods $T_1$ to achieve frequent updates of the transmit weights. FIG. 3b relates to a beamforming scenario assuming two antennas separated half a wavelength and having correlated fading. A set of beamforming weight vectors is defined as above in order to achieve a set of beams pointing in different directions. In this case it is expected that the best beam varies relatively slowly and therefore a longer measurement period $T_2$, as illustrated in FIG. 3b, can be applied.

The following assumes, as an example, that the received downlink power is the channel property on which the determination of the quality indicator of the pilot patterns is based. The mobile terminal will measure 202 said power value for each of the received beams and determine the best pilot or, alternatively, determine a set of best pilots, e.g. those pilots having a measured channel property value that is above a certain threshold value. The mobile terminal then determines the quality indicator for each pilot signal as a function of the measured channel property. The derived information is sent back to the access point as feedback information 203, preferably in form of a quality report of the downlink channel properties of each mobile terminal comprising information on a number n≦N of the pilot signals including said quality indicator and at least an identification of the pilot. Optionally, the report can also include an indication of the channel property on which said quality indicator is based and a time indicator when this measurement was done. The method according to the present invention implies thus the advantage that the necessary feedback information can be considerably reduced.

The access point receives thus an indicator of the downlink reception quality of the mobile terminals within its coverage area. In a next step the access point can adapt 204 the pilot beams for the mobile terminals in order to increase the downlink channel quality for the beams that are represented by the pilot signals. By adapting the pilot signals, and correspondingly the measurement periods, the feedback information, which is returned from the mobile terminals, can be optimised, e.g., with regard to different terminal speeds or different coherency bandwidths. High speed mobile terminals need to update the transmission weights more often and need a shorter measurement period. In this case it is advantageous to use a smaller set of transmission weights. However, a mobile terminal with low mobility can use a larger set of transmission weights and longer measurement periods. One example of an adaptation mechanism for the pilot weight vectors could be described as follows: On reception of a feedback report for previously transmitted pilot signals including a quality indicator for each of said signals the weights of the pilot signal having the smallest quality indicator is adapted in such a way that the beam representing said pattern is located between the two pilot patterns having the largest quality indicators. Another way to create new weight vectors is to generate new weight vectors by means of random perturbations of the best weight vectors, i.e. comprising the largest quality indicators. However, instead of performing an adaptation it can already be sufficient to select the beam having the largest quality indicator for a specific mobile terminal. Thus, at the next instance the pilot signals are transmitted 205 with the improved set of weight vectors.

Figure 4A:
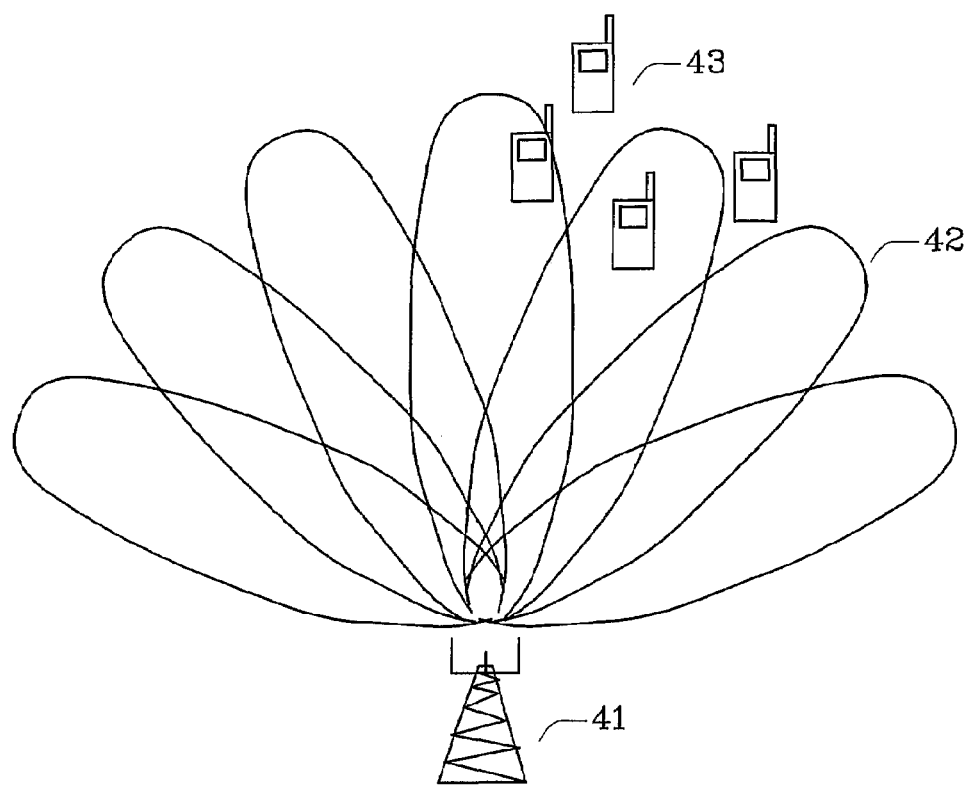
FIGS. 4a and 4b illustrate the change of distribution of antenna beams by means of adapting the vectors of transmission weights for the various pilot signals transmitted by the access point.
Figure 4B:
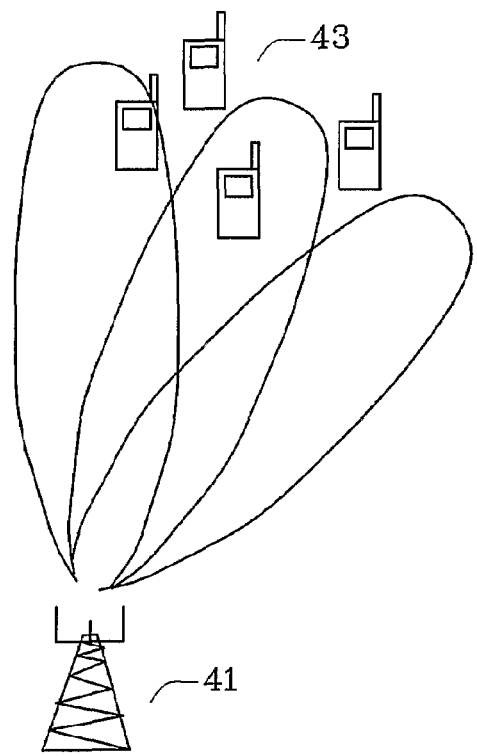

FIGS. 4a and 4b show an example of adapting the set of transmission weight by using the method according to the present invention. Initially, as shown in FIG. 4a, the access point 41 selects a large set of random transmission weights for generating a widely separated group of beams 42. The access point 41 then adapts said transmission weights successively in response to the received quality reports that the mobile terminals 43 retransmit as feedback information of the transmitted pilot signals. FIG. 4b illustrates that the access point 41 learns in which way the mobile terminals 43 are grouped and, thus, which of said transmission weights, corresponding to only a small number of beams, must be probed. In a conceivable embodiment of the method according to the present invention the access point 41 can during operation scan the entire coverage area with certain time intervals in order to update the set of transmission weights while "hot areas" containing a larger number of mobile terminals 43 are updated more frequently.

In general, past and current measurement reports from the terminals are used, and the adaptation can be viewed as a mapping from the set of current and previous weight vectors in addition of to the quality reports to a set of new weight vectors in addition to conditions such as the whether each beam should serve one or several users. This can be formulated in the general case as a two step procedure. First an objective function $f$ is defined as:

$$f(W,Q,w).$$

W is the set of the previous and current weights, Q is the set of quality indicators corresponding to the weight vectors within W, and w is a set of weights contained in W. The scalar valued cost function will thus associate an accumulated quality measure for the weights w. In this way, a set of best weights can be found as $$w_{best} = \arg\max_w(f(W,Q,w))$$

The cost function can e.g. calculate a condensed quality measure for each weight, and group the weights in subsets, possibly based on a distance measure such as an inner product or an Euclidian distance. The objective function can then be e.g. the sum of quality measures when one vector is taken from each subset. Based on the set of best weights, a new set of weights can be obtained as $$w_{new} = g(w_{best})$$

Note that the number of weights in $w_{new}$ can be larger than the number of weights in $w_{best}$. The function $g(\cdot)$ can form a new set of weights such as linear combinations of the input weights, random perturbations, and/or deterministic time-varying functions.

Note that the present invention is used in a multi-user scenario. The access point receives multiple feedback reports from a plurality of mobile terminals, which all have received a transmitted set of pilot patterns. The feedback reports, i.e. the quality indicators with respect to the various pilot patterns, depends, however, on the position of the mobile terminal within the coverage area of the access point. This scenario implies thus an adaptation of the set of transmit weights for the pilot patterns that intends to optimise the downlink channel quality with respect to all mobile terminals.

In the following, this is elaborated in more detail. Suppose that several users are to be served with a single beam. A set of beams is then generated, and for each weight, quality reports are obtained. A quality measure for each beam can then be taken as the lowest reported quality report for all the terminals served. A single best beam can then be taken as the beam with the highest beam quality measure and a new set of weights can be generated as random perturbations of this best beam.

Suppose that several users are served and that individual beams are used for all the users. A set of weight pairs can then be generated and an aggregate quality measure can then be obtained for all weights using the quality reports from all the terminals. In each pair of weights, the best weight can be identified and a new set of weights can by e.g. perturbing each best weight. This procedure is then repeated.

The invention claimed is:

1. A method in an transmitter of a multi-carrier system, said transmitter transmitting one or more data streams over a set of M antennas to a plurality of mobile terminals, comprising the steps of:

transmitting a number of pilot sequences comprising an ordered set of symbols, wherein each symbol is associated with a predetermined time and frequency resource and a complex transmission weight for each antenna;

adapting the transmission weights associated to the pilot sequences to achieve an optimisation of an objective function of the set of quality indicators, which the mobile terminals have derived from measurements of at least one downlink channel property;

transmitting said pilot sequences with the adapted transmission weights; and, transmitting one or several information streams using the one or several of the adapted transmission weights;

wherein the step of adapting the transmission weights comprises the steps of:

applying current and previous measurement reports and transmission weights to derive a subset of best weights; and, using said subset to generate the adapted transmission weights.

2. The method according to claim 1, wherein the transmission weights are adapted to be applicable for a multicast transmission of information that is common to one or more selected groups of users.

3. The method according to claim 1, wherein the set of transmission weights is adapted so that at least a subset of weights is applicable for a transmission of information to selected users at selected instances.

4. The method according to claim 1, wherein:

a first subset of the transmission weights is adapted to be applicable for a multicast transmission of information that is common to one or more selected groups of users; and, a second subset of transmission weights is adapted so that at least a subset of weights is applicable for a transmission of information to selected users at selected instances.

5. The method according to claim 1, wherein the procedure is carried out multiple times.

6. The method according to claim 1, wherein the adapted transmission weights are generated by means of a linear combination of said best subset of best weights in combination with a random perturbation.

* * * * *